Patented Aug. 17, 1948

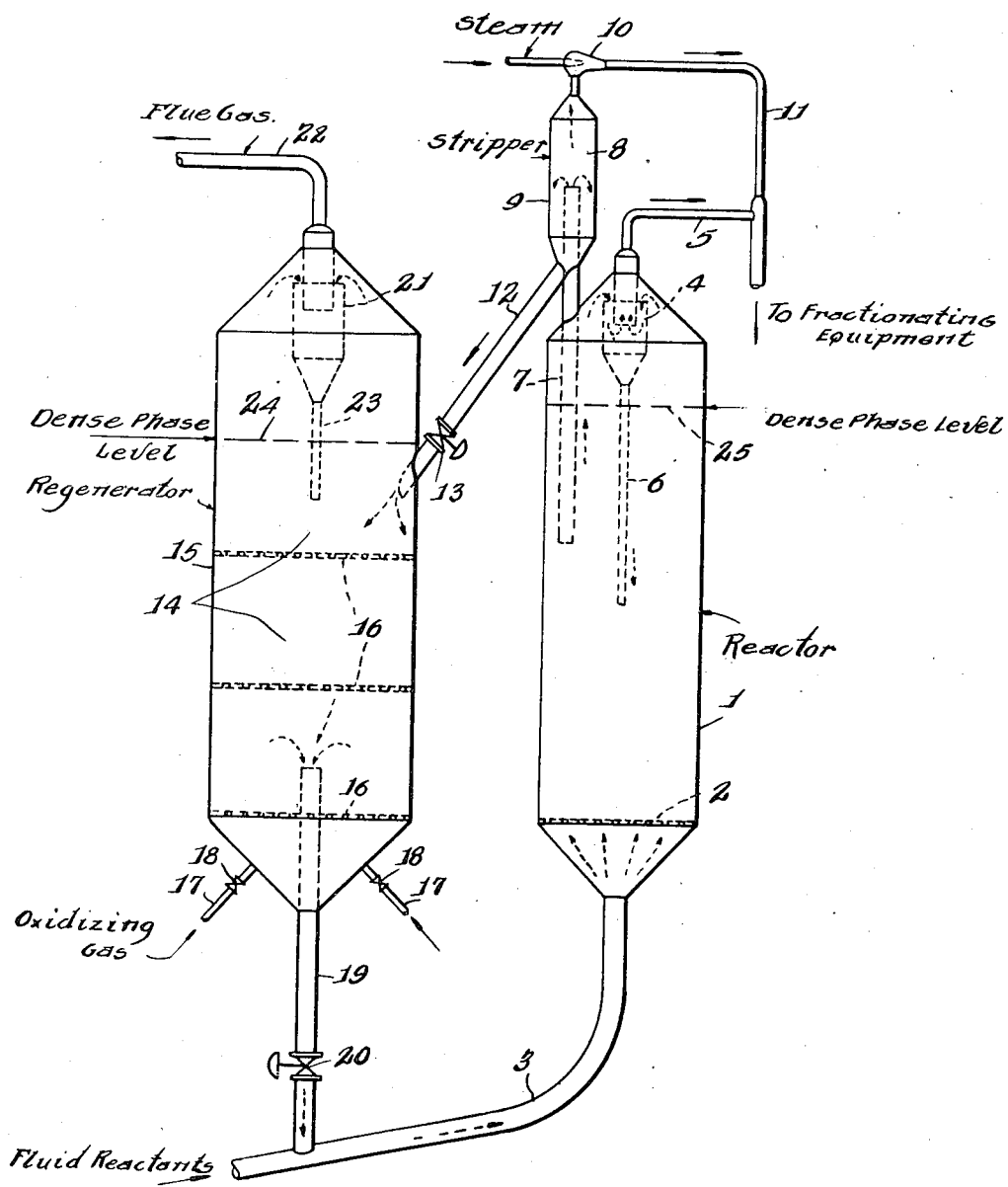

2,447,116

UNITED STATES PATENT OFFICE 2,447,116

VACUUM STRIPPING OF MOVING CATALYST IN HYDROCARBON CONVERSION PROCESS

Robert B. Collins, Downers Grove, Ill., assignor to Universal Oil Products Company, Chicago, Ill., a corporation of Delaware Application July 30, 1945, Serial No. 607,890

2 Claims. (Cl. 196—52)

This invention relates to an improved fluidized process for the conversion of fluid hydrocarbons in the presence of subdivided solid catalyst, which becomes contaminated with a carbonaceous deposit during the conversion reaction and is subsequently removed by a regenerating operation. More specifically, the invention is directed to a method of vacuum stripping provided to remove occluded and entrained gaseous and vaporous hydrocarbons from contaminated catalyst prior to its regeneration.

The fluidized process is characterized by the fact that processing of the fluid reactants and regeneration of the contaminated catalyst are accomplished continuously in separate confined reaction and regenerating vessels between and through which the catalyst is continuously passed in series. The mass of catalyst being employed to promote the conversion reaction in the reaction vessel is maintained in the fluid-like condition by passing the fluid reactants and resulting fluid conversion products upwardly through the bed at a velocity controlled to keep the latter in a relatively dense fluid-like condition. Similarly, the mass of catalyst undergoing regeneration in the regenerating vessel is maintained in the form of a fluid-like bed of solid catalyst particles. Fluidization of the bed is accomplished by passing the oxidizing gases employed to burn combustible contaminants from the catalyst and the resulting hot combustion gases upwardly through the bed at a velocity which partially counteracts the forces of gravity on the catalyst particles and causes hindered settling of the latter.

The principal feature of this invention resides in the continuous contaminated catalyst drawoff from the reactor to an elevated vacuum stripping zone above the reaction zone and the downward gravity flow of contaminated catalyst, stripped of occluded and entrained volatile material, from the vacuum stripper to the regenerating zone. In the regenerator the catalyst is received at the upper end of the dense phase fluid-like bed where it flows downwardly while in fluid condition, countercurrent to the oxidizing and reactivating gas stream flowing upwardly therethrough. This invention is not limited to any specific hydrocarbon conversion; the well known catalytic cracking, catalytic dehydrogenation, catalytic aromatization, etc. exemplify reactions of the general type.

The catalysts commonly employed for hydrocarbon conversion reactions of the type above mentioned rely upon their porosity, as well as upon their specific composition, for good catalytic activity. The catalyst may be of the finely pulverized or powdered type, or of the specially prepared spherical type. The latter type, known as "micro-spherical" catalyst, is of a more uniform particle size, and has certain advantages over the powdered types. For example, the spherical particles are less subject to attrition, as there are no sharp edges present to wear off. They are easier to separate and recover from the exit gas streams. Also, because of their spherical shape and uniformity in size, the micro-spherical catalyst particles flow with greater facility and with less danger of plugging.

The combustibles accumulated by the catalyst particles in the conversion step reduce their activity and are conventionally removed by burning. These combustible contaminants are ordinarily referred to as "catalyst carbon" or "coke," but, in addition to any carbonaceous or coke-like material, the catalyst particles also absorb a substantial quantity of volatile hydrocarbons and these volatiles are usually occluded in the stream of catalyst being supplied from the reaction zone to the regenerating zone. It is common practice to perform a so-called "stripping" operation on this stream of catalyst particles to drive off some of the volatile combustibles by passing the stream in countercurrent contact with steam or other relatively inert or noncombustible gas. However, the catalyst particles are susceptible to damage at excessively high temperatures and in most instances steam is detrimental to their activity, particularly at relatively high temperatures.

The vacuum stripping method provided by the present invention provides efficient stripping of volatiles without the detrimental effect of the action of steam on the catalyst particles themselves. The contaminated catalyst particles are passed from the reaction zone into an elevated and enlarged stripping zone operating at reduced pressure, such that entrained and occluded hydrocarbon vapors are released from the catalyst particles and withdrawn by a steam ejector or other vacuum producing means operating in conjunction with the stripper. The principal stream, that of the contaminated or used catalyst, will flow by gravity from the lower end of the stripping zone to the regenerating zone, where the carbonaceous material deposited on the catalyst will be removed by oxidation.

Suitable vacuum or pressure reducing means at the stripping chamber and restricting flow control means on the stripped catalyst transfer conduit may be operated to maintain the desired continuous flow; that of withdrawing a dense phase stream upward to the stripping zone and therein effecting a reversal of flow allowing the catalyst stream to descend by gravity to the regenerating zone.

There are various types of vacuum producing means, which may be used in conjunction with the stripper, such as for example a steam ejector, a rotary type pump, or an exhauster fan. The stripped hydrocarbon vapors which are withdrawn from the stripping zone may be charged to the fractionating equipment together with the conversion products from the top of the reaction zone, or they may be charged to other suitable recovery apparatus.

The stripping step provided by the invention is advantageous in reducing the quantity of heat generated in the regenerating zone. Further, the chances of "after burning" occurring in the regenerator or regenerator exit ducts will be substantially reduced or eliminated.

In operations of the fluid bed type, such as has been outlined, a condition which is extremely detrimental to the activity of the catalyst has been found to exist at times in that region of the regenerating zone known as the "light phase." This light phase is a region of relatively low catalyst particle concentration maintained above the more dense fluid-like phase. This detrimental condition referred to is termed "after burning" and may occur when an inflammable gas mixture exists in the light phase. The burning of combustibles from the catalyst in the fluid bed results in the formation of combustion products including $CO_2$, $CO$, and $H_2O$. Under operating conditions, as commonly practiced, some free oxygen is also present in the mixture and when the oxygen and CO are in the proper proportions, the mixture is readily combustible. One of the principal objects of the stripping and flow method of this invention is to provide an operation of the fluid bed type in which "after burning" and resulting catalyst deactivation is obviated.

In the preferred embodiment of the invention, contaminated catalyst particles with combustible deposits and occluded hydrocarbon vapors are passed upwardly from within the dense phase of the reaction zone to a stripping zone having a reduced pressure region and vacuum means for removal of vapors released or stripped from the said catalyst particles. The catalyst particles stripped of combustible carbonaceous deposits are then passed to the upper region of the dense phase zone in the regenerator to pass countercurrently to upwardly flowing oxidizing and regenerating gases which are charged to the lower end of the regenerator. With this method of handling the catalyst from the conversion zone, that which contains the greatest amount of combustible deposits and is relatively cool, first comes into contact with regenerating gas which is relatively low in free oxygen content and relatively hot, while the incoming fresh oxidizing gas, which is relatively high in oxygen and is relatively cool, first comes into contact with the catalyst about to be returned to the reaction zone, this catalyst being relatively hot and carrying only a small amount of combustible deposits.

The features of the invention will be further explained in conjunction with the following description of the accompanying diagrammatic drawing.

Referring to the drawing, the reaction vessel 1 comprises a vertically elongated, substantially cylindrical shell, having tapered upper and lower heads.

A perforate plate 2 or other suitable form of distributing member is disposed within the reactor 1 at substantially the junction of the bottom head and the cylindrical shell of the vessel and serves to distribute the fluid reactants and catalyst, which are supplied by way of conduit 3. A catalyst separator 4 of the centrifugal or cyclone type is positioned within the upper head of the vessel for removing and recovering entrained catalyst particles from the outgoing conversion products stream. The product stream is carried to suitable fractionating equipment by way of line 5. The collecting hopper of the separator 4 and the dip pipe 6 serves to return the catalyst to the dense phase region within the reaction vessel 1.

The used catalyst drawoff line 7 passes upwardly through the top portion of the vessel 1 and extends to a point within an enlarged stripping zone 8 provided by the cylindrical chamber 9. A steam ejector 10 or other type of vacuum producing means is positioned at the top of the stripper to aid in the efficient release and removal of absorbed and entrained hydrocarbon vapors from the used catalyst being transferred to the regenerator. The stripped vapors are carried by way of line 11 to conduit 5 which transfers them together with the conversion products to suitable fractionating equipment (not shown).

The used catalyst particles, contaminated by deleterious deposits acquired in the reactor during the conversion process, will flow down around the extension of conduit 7 in the stripper 9 and pass downwardly through conduit 12 and through flow-control valve 13 to the upper portion of the fluid bed 14 in the regenerator 15.

The regenerator 15, similar in form to the reactor 1, is also a vertically elongated, substantially cylindrical shell, having tapered upper and lower heads. Perforated distributing plates or grids 16 are placed at intervals across the vessel and serve to substantially uniformly distribute the catalyst entering the upper part of the fluidized bed and the air or other oxidizing gas, which is supplied to the lower portion of the vessel through lines 17 and valves 18. The conduit 19 has an extended portion to a point within the regenerator 15 to receive reactivated and regenerated catalyst. The regenerated catalyst is allowed to pass downwardly through the line 19 and flow-control valve 20, and thus mix with the incoming fluid reactants which are charged through the conduit 3.

At the top head of the regenerator a centrifugal type separator 21 is placed, in similar fashion to the one in the reactor 1. This separator 21 serves to remove catalyst particles from the stream of combustion and flue gases leaving the regenerator by way of conduit 22. The separated catalyst is returned to the dense phase zone 14 within the regenerator by means of dip pipe 23.

In operation, the upper extremity of the fluid-like bed 14 in the regenerator 15 is maintained at a suitable elevation above the uppermost grid 16 and beneath the inlet to the separator 21, leaving a light phase region in the upper portion of the vessel. This light phase region contains a substantially lower concentration of catalyst particles than that within the dense phase bed. The approximate upper extremity of the dense fluid bed in the regenerator is indicated by the broken line 24.

A dense fluid-like bed of subdivided solid catalyst is also maintained within the reaction vessel, and the approximate upper extremity of the bed is indicated by the broken line 25. As in the regenerator, a light phase of materially reduced catalyst particle concentration prevails in the upper portion of the vessel between the inlet to the separator 4 and the upper dense phase extremity 25, so that a major separation of catalyst particles from outgoing fluid conversion products is accomplished within the reactor before the vapors enter separator 4.

The incoming fluid reactants, preheated when necessary to the desired temperature are supplied to the reactor by way of conduit 3. In conduit 3, the reactants meet and commingle with a stream of hot catalyst particles supplied from the lower end of the fluid-like bed in the regenerator 15 through line 19 and the adjustable flow-control valve 20. The gas-lift action of the vaporous or gaseous reactants transports the catalyst through the line 2 into the lower portion of the reactor 1, the mixture being substantially uniformly distributed over the cross-section of the vessel by the perforated plate member 2.

Conversion of the fluid reactants takes place as they pass upwardly through the reactor in contact with the catalyt. The resulting fluid conversion products pass from the light phase region through the separator 4, as previously noted, to the line 5 and to fractionating and recovery equipment of conventional form (not illustrated).

A continuous stream of catalyst particles containing deleterious combustible deposits as well as lighter volatiles is withdrawn from a point within the reactor, below the upper extremity 25 of the dense fluid-like bed, into the vacuum stripper 9. The stripper having suction or vacuum producing means, such as the steam ejector 10 at its upper end, operates to withdraw a substantially dense phase stream of the catalyst particles upward to the enlarged zone 8. The steam ejector also effects reduced pressure within zone 8 which allows the entrained volatile materials to be released or stripped from the catalyst and carried by way of line 11 and line 5 to recovery equipment. The elevated stripping zone 8 is operated at a reduced pressure such that the transfer stream of catalyst particles passing upwardly from the reactor will descend over the upper end of conduit 7, downward thru the annular space provided to the lower end of the stripping chamber 9 and flow by gravity through line 12 to the upper portion of the dense phase bed 14 within the regenerator 15. The flow through line 12 may be controlled by valve 13.

As previously stated, the catalyst supplied to the upper section of the regenerator passes in a general downward direction through the succeeding plates 16 countercurrent to the ascending regenerating gas, supplied through lines 17 and valves 18. Regenerated catalyst is withdrawn through line 19 and passed to line 3 to complete the cycle. Combustion gases, evolved from the regeneration of the catalyst particles are passed through the separator 21 in the upper part of the regenerator. Catalyst particles are returned through the dip pipe 23 to the fluid bed 14, while the outgoing combustion gases are directed through line 22 preferably to suitable heat recovery equipment, such as a steam generator or waste heat boiler, hot gas turbine or the like, not illustrated.

The mode of catalyst handling and transfer as provided by this invention is very advantageous in that stripping of volatiles from the catalyst is accomplished without the detrimental effect of steam or other material being placed directly in contact with the catalyst particles. Also, the possibility of the "after burning" phenomenon is made quite remote by this flow through the vacuum stripper to the upper portion of the regenerator wherein a fluidized downflow of catalyst is maintained. The catalyst particles with combustible carbonaceous deposits enter the zone within the regenerator where there is but little oxygen present, and are thus gradually burned or further stripped as they move downward in the vessel to come in contact with gases of sufficiently high oxygen content to complete the burning of the combustible deposits.

I claim as my invention:

1. In a hydrocarbon conversion process wherein a hydrocarbon charge is passed upwardly at conversion conditions through a reaction zone containing a body of finely divided solid catalyst to form a lower dense fluidized catalyst phase and an upper light phase, and wherein the resultant contaminated catalyst is supplied to a regeneration zone wherein an oxidizing gas is passed upwardly through said contaminated catalyst to form a lower dense fluidized catalyst phase and an upper light phase, the improvement which comprises passing contaminated catalyst upwardly by suction from the dense phase in said reaction zone to an enlarged stripping zone, maintaining a vacuum in said stripping zone and therein vacuum stripping occluded volatile hydrocarbons from said contaminated catalyst, and passing the resultant stripped catalyst downwardly by gravity flow from said stripping zone directly into the dense phase in said regeneration zone.

2. The process of claim 1 further characterized in that the stripped catalyst is introduced into the upper portion of the dense catalyst phase in said regeneration zone and is passed downwardly therein in countercurrent contact with an ascending stream of oxidizing gas.

ROBERT B. COLLINS.

REFERENCES CITED

The following references are of record in the file of this patent:

UNITED STATES PATENTS

| Number | Name | Date |
|---|---|---|
| 2,095,265 | Pew | Oct. 12, 1937 |
| 2,289,329 | Prickett | July 7, 1942 |
| 2,353,495 | Payne | July 11, 1944 |
| 2,355,016 | Stein | Aug. 1, 1944 |
| 2,367,281 | Johnson | Jan. 16, 1945 |
| 2,369,523 | Belchetz | Feb. 13, 1945 |
| 2,379,027 | Monro | June 26, 1945 |